(12) United States Patent
Pang et al.

(10) Patent No.: US 8,593,255 B2
(45) Date of Patent: Nov. 26, 2013

(54) METHOD AND APPARATUS FOR PROVIDING USER INTERACTION VIA TRANSPONDERS

(75) Inventors: Hawk Yin Pang, San Jose, CA (US); Karim Seada, Mountain View, CA (US); Zhigang Liu, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 333 days.

(21) Appl. No.: 12/429,918

(22) Filed: Apr. 24, 2009

(65) Prior Publication Data

US 2010/0271177 A1 Oct. 28, 2010

(51) Int. Cl.
*H04Q 5/24* (2006.01)
*G06F 3/03* (2006.01)
*G06F 13/00* (2006.01)

(52) U.S. Cl.
USPC ............. 340/10.1; 340/524; 345/1.2; 725/51

(58) Field of Classification Search
USPC ................ 340/2.2, 8.1, 10.1–10.4, 500–505, 340/524–525, 539.1–539.11, 340/539.22–539.25, 572.1; 345/1.2, 3.1, 345/55; 455/41.1–41.3; 725/37–61, 725/131–133
See application file for complete search history.

(56) References Cited

U.S. PATENT DOCUMENTS

| | | | |
|---|---|---|---|
| 5,960,411 A | 9/1999 | Hartman et al. | |
| 6,446,208 B1 * | 9/2002 | Gujar et al. | 713/185 |
| 6,708,176 B2 * | 3/2004 | Strunk et al. | 1/1 |
| 6,791,452 B2 * | 9/2004 | Fletcher et al. | 340/10.6 |
| 7,394,346 B2 * | 7/2008 | Bodin | 340/5.51 |
| 7,453,418 B2 | 11/2008 | Palmquist | |
| 7,471,209 B2 * | 12/2008 | Hart | 340/686.1 |
| 7,515,136 B1 * | 4/2009 | Kanevsky et al. | 345/156 |
| 7,636,365 B2 * | 12/2009 | Chang et al. | 370/401 |
| 8,118,223 B2 * | 2/2012 | Hammad et al. | 235/384 |
| 8,175,531 B2 * | 5/2012 | Rekimoto et al. | 455/41.3 |
| 8,180,289 B1 * | 5/2012 | Glickman | 455/41.1 |
| 8,441,338 B2 * | 5/2013 | Naressi et al. | 340/10.1 |
| 2003/0171984 A1 * | 9/2003 | Wodka et al. | 705/14 |

(Continued)

FOREIGN PATENT DOCUMENTS

| | | |
|---|---|---|
| EP | 1 422 874 A1 | 5/2004 |
| EP | 2 051 194 A2 | 4/2009 |

(Continued)

OTHER PUBLICATIONS

"Data Tiles: A Modular Platform for Mixed Physical and Graphical Interactions"; Jun Rekimoto, Brygg Ullmer, Harou Oba; SIGCHI'01, Mar. 31-Apr. 4, 2001, Seattle, WA, USA.*

(Continued)

*Primary Examiner* — Steven Lim
*Assistant Examiner* — Stephen Burgdorf
(74) *Attorney, Agent, or Firm* — Ditthavong, Mori & Steiner, P.C.

(57) ABSTRACT

An approach is provided for user interaction via transponders (e.g., near field communication (NFC) tag, radio frequency identification (RFID) tag, or contactless card) disposed on a dynamically reconfigurable display. Each transponder corresponds to an area of the display that is associated with one or more actions. The actions are dynamically updated based at least in part on the content presented on the respective area of the display. A user equipment containing a transponder reader detects a signal from one of the transponders to trigger the corresponding action.

18 Claims, 13 Drawing Sheets

(56) References Cited

U.S. PATENT DOCUMENTS

| | | | |
|---|---|---|---|
| 2004/0248617 A1* | 12/2004 | Oba et al. | 455/557 |
| 2005/0237295 A1* | 10/2005 | Anderson | 345/156 |
| 2006/0176239 A1* | 8/2006 | Sweeney | 345/1.2 |
| 2007/0057790 A1* | 3/2007 | Alden et al. | 340/572.1 |
| 2007/0057893 A1 | 3/2007 | Alden | |
| 2007/0203796 A1 | 8/2007 | Riggs, III | |
| 2008/0046570 A1 | 2/2008 | Abel | |
| 2008/0194298 A1 | 8/2008 | Panabaker et al. | |
| 2008/0201212 A1* | 8/2008 | Hammad et al. | 705/13 |
| 2008/0259416 A1 | 10/2008 | Peters et al. | |
| 2008/0266097 A1 | 10/2008 | Lee | |
| 2008/0278325 A1 | 11/2008 | Zimman et al. | |
| 2008/0303682 A1* | 12/2008 | Han | 340/686.1 |
| 2009/0034843 A1 | 2/2009 | Wittkamper et al. | |
| 2009/0121874 A1* | 5/2009 | Nomura et al. | 340/572.1 |
| 2009/0128296 A1 | 5/2009 | Han et al. | |
| 2009/0137204 A1* | 5/2009 | Chang | 455/41.1 |
| 2009/0174670 A1* | 7/2009 | Diederiks | 345/173 |
| 2009/0231109 A1* | 9/2009 | Reichert et al. | 340/10.41 |
| 2009/0271727 A1* | 10/2009 | Levy et al. | 715/771 |
| 2010/0075666 A1* | 3/2010 | Garner | 455/426.1 |
| 2010/0211980 A1* | 8/2010 | Nair | 725/60 |
| 2010/0216396 A1* | 8/2010 | Fernandez et al. | 455/41.1 |
| 2010/0282835 A1* | 11/2010 | Wakamoto et al. | 235/375 |

FOREIGN PATENT DOCUMENTS

| | | |
|---|---|---|
| JP | 2007-328547 A | 12/2007 |
| KR | 10-2008-0051286 A | 6/2006 |
| WO | WO 2007/112787 A1 | 10/2007 |
| WO | 2007135711 A1 | 11/2007 |
| WO | 2009/051639 A1 | 4/2009 |
| WO | 2009/052059 A1 | 4/2009 |

OTHER PUBLICATIONS

"SenseTable: A Wireless Object Tracking Platrform for Tangible User Interfaces"; James Patten, Hiroshi Ishii, Jim Hines and Gian Pangaro; Published in the Proceedings of CHI 2001, Mar. 31-Apr. 5, 2001; ACM Press, 2001.*

"Hello.Wall—Beyond Ambient Displays"; Thorsten Prante, Carsten Rocker, Norbert Streitz, Richard Stenzel, Carsten Magarkurth; 5th International Conference on Ubiquitous Computing (Ubicomp 2003), Oct. 12-15, 2003, Seattle, WA USA.*

Intl search report and written opinion for corresponding intl app. No. PCT/FI2010/050273 dated Aug. 17, 2010, pp. 1-17.

Office Action for related Canadian Patent Application No. 2,759,787, "Method and Apparatus for Providing User Interaction via Transponders", dated Jul. 24, 2013, pp. 1-5.

* cited by examiner

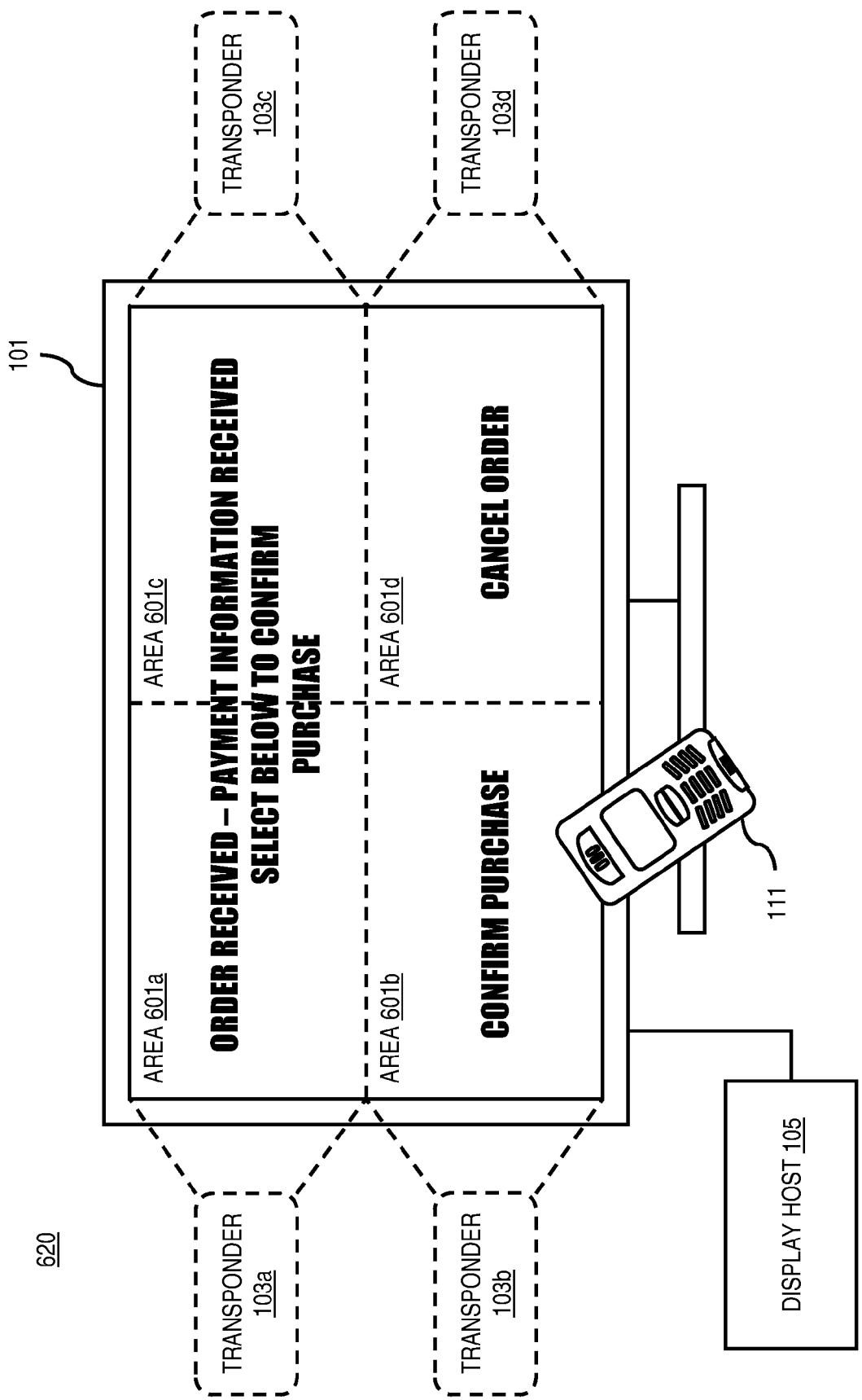

METHOD AND APPARATUS FOR PROVIDING USER INTERACTION VIA TRANSPONDERS

BACKGROUND

Wireless (e.g., cellular) service providers and device manufacturers are continually challenged to deliver value and convenience to consumers by, for example, providing compelling network services. One area of development has been the use of mobile devices to facilitate user interaction with the increasing amount and variety of services (e.g., applications, content) available to users. To interact with services, a user generally has to provide at least some information (e.g., user login information such as a user identification and password, payment information for online commerce services, personal information for registering with certain services, etc.). This information often is repetitive and provided by the user through manual input, making the process of accessing the services and related content potentially inconvenient to the user.

SOME EXAMPLE EMBODIMENTS

Therefore, there is a need for an approach for quickly and conveniently interacting with services to perform one or more action.

According to one embodiment, a method comprises initiating detection of a signal from one of a plurality of transponders disposed on a dynamically reconfigurable display. Each of the transponders corresponds to an area of the display. The method also comprises means for determining an action in response to the signal. The action is related to content displayed in the respective area of the display.

According to another embodiment, an apparatus comprising at least one processor, and at least one memory including computer program code, the at least one memory and the computer program code configured to, with the at least one processor, cause the apparatus to initiate detection of a signal from one of a plurality of transponders disposed on a dynamically reconfigurable display. Each of the transponders corresponds to an area of the display. The apparatus is also caused to determine an action in response to the signal. The action is related to content displayed in the respective area of the display.

According to another embodiment, a computer-readable storage medium carrying one or more sequences of one or more instructions which, when executed by one or more processors, cause an apparatus to initiate detection of a signal from one of a plurality of transponders disposed on a dynamically reconfigurable display. Each of the transponders corresponds to an area of the display. The apparatus is also caused to determine an action in response to the signal. The action is related to content displayed in the respective area of the display.

According to another embodiment, an apparatus comprises means for initiating detection of a signal from one of a plurality of transponders disposed on a dynamically reconfigurable display. Each of the transponders corresponds to an area of the display. The apparatus also comprises means for determining an action in response to the signal. The action is related to content displayed in the respective area of the display.

According to yet another embodiment, an apparatus comprises a dynamically reconfigurable display. The apparatus also comprises a plurality of transponders disposed on the display. Each of the transponders corresponds to an area of the display.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6C are diagrams of user interfaces utilized in the process of FIG. 5, according to various embodiments;

DESCRIPTION OF PREFERRED EMBODIMENT

A method and apparatus for providing user interaction via transponders disposed on a display are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
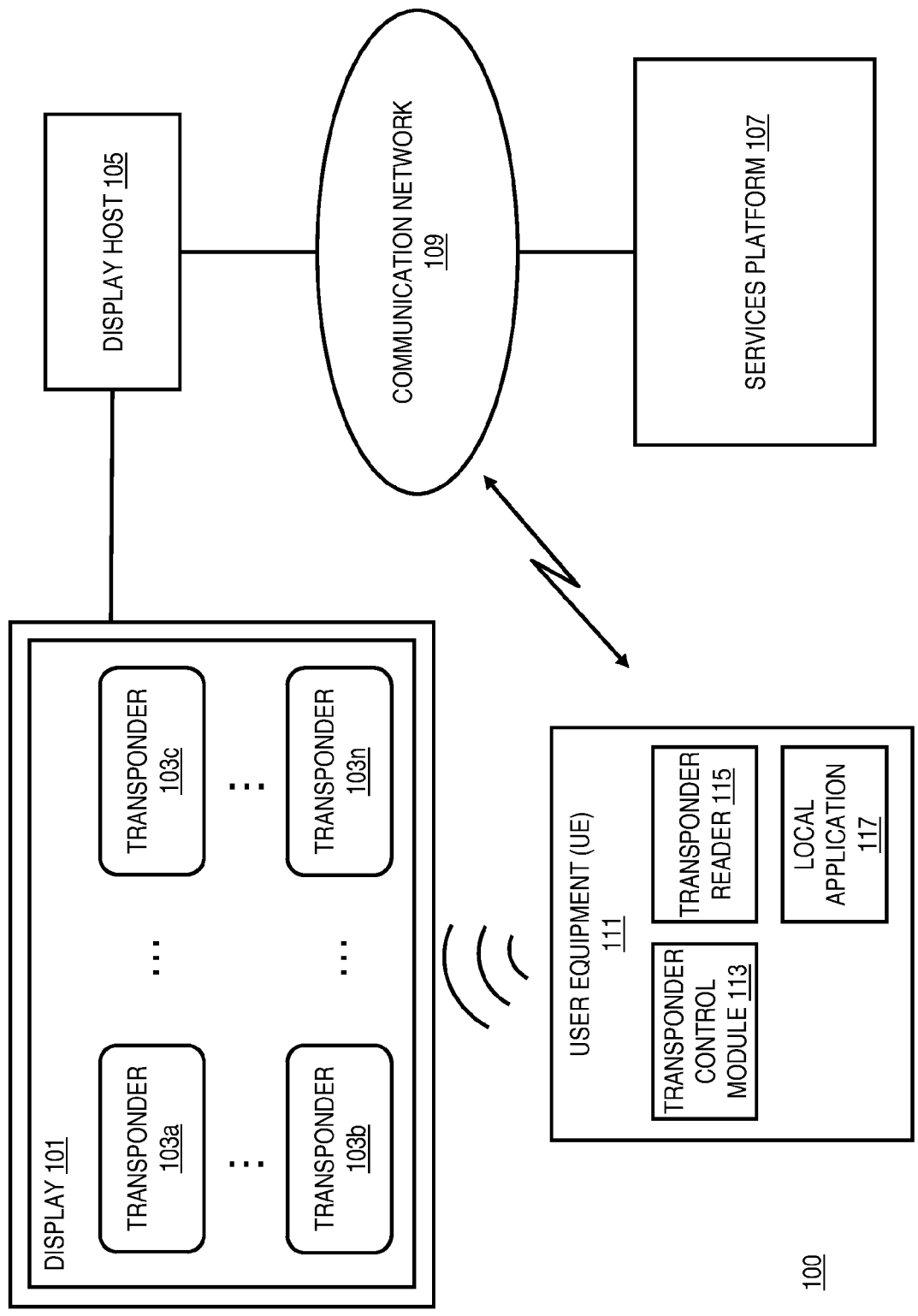
FIG. 1 is a diagram of a system capable of providing user interaction via transponders disposed on a display, according to one embodiment.

FIG. 1 is a diagram of a system capable of providing user interaction via transponders disposed on a display, according to one embodiment. As previously discussed, users have access to a growing variety of services and content available over both electronic communication networks (e.g., cellular networks, data networks, etc.) and traditional media (e.g., billboards, posters, print media). However, the process of interacting with these services traditionally has remained cumbersome (e.g., requiring at least some form of manual, and often repetitive, input of information). To address this problem, a system 100 of FIG. 1 enables user interaction with services, applications, and content through one or more transponders disposed on a dynamically reconfigurable display for presenting information related to the services, applications, or content. As used herein, the term "dynamically reconfigurable" means that the display or a portion of the display is capable of being programmed or otherwise made to show and/or update different content at different locations of the display. The system 100 then associates the content displayed at a specific location of the display with a respective transponder at the same location. In this way, a user can utilize, for instance, a mobile device containing a transponder reader to trigger an action related to the displayed content by bringing the mobile device within proximity of the transponder corresponding to the content. The system 100, therefore, advantageously reduces and streamlines the inputs needed from a user to interact with services. Moreover, in various embodiments, the displayed content and corresponding action can be dynamically updated so that the respective transponder is then associated with the updated content and action.

As shown in FIG. 1, the system 100 comprises a display 101 including one or more transponders 103a-103n disposed on the display 101. The display 101 may be an electronic video display including a monitor or television using any available display technology such as cathode ray tube (CRT), liquid crystal display (LCD), plasma, organic light emitting diode (OLED), and the like. The display 101 may also be incorporated in a variety of devices including laptops, personal digital assistants (PDAs), electronic books, multimedia tablets, and other like devices. In addition or alternatively, the display 101 may be a non-electronic display that is reconfigurable including a reconfigurable poster, billboard, menu, pamphlet, brochure, etc. For example, a reconfigurable billboard may include multiple posters that are rotated (e.g., using a mechanical scrolling system) at various intervals to display different content. In another example, a restaurant menu display may be rotated to display a lunch menu during the day and a dinner menu during the evening.

The transponders 103a-103n can be, for instance, integrated or embedded into the display 101 such that each transponder 103 corresponds to a specific area of the display 101. In various embodiments, the transponders 103 are arranged in an array corresponding to all or a portion of the display 101. By way of example, the transponders 103a-103n can be near field communication (NFC) tags, radio-frequency identification (RFID) tags, contactless cards, other like transponders, or a combination thereof. NFC is a short-range high frequency (e.g., operating at 13.56 MHz) wireless communication technology, which allows data exchange between two devices at a distance of approximately 10 cm. NFC is compatible with current contactless card infrastructure such as the infrastructure used for public transportation payment systems. NFC is also compatible with RFID tags.

The display 101 may be attached to a display host 105 that controls the mapping of the content presented on the display 101 to the one or more transponders 103a-103n disposed on the display 101. In certain embodiments, the display host 105 can dynamically update the content presented on the display 101 and program the information transmitted by each of the transponders 103a-103n according to the content displayed in the respective area of the display 101. The information, for instance, is transmitted in a signal to trigger one or more actions (e.g., initiating a purchase, initiating a payment, initiating an order, initiating a transfer of content, initiating management of a membership or subscription, initiating a request for information, initiating interaction with a game, or a combination thereof) related to the displayed content. The display host 105 also has connectivity to a services platform 107 via a communication network 109. The services platform 107 offers a variety of services (e.g., online commerce, Internet access, social networking, games, electronic books, etc.) to support the actions triggered by the transponders 103a-103n. The services available on the services platform 107 may be offered by a service provide, third party, or combination therof.

By way of example, the communication network 109 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

The system 100 also includes one or more user devices (e.g., user equipment (UE) 111) having connectivity to the communication network 109. In one embodiment, the UE 111 includes a transponder control module 113 that provides the logic to control the functions a transponder reader 115 to read information from the transponders 103a-103n. The transponder control module 113 can then use the information to initiate an action via, for instance, the local application 117. For example, the transponder control module 113 can direct the transponder reader to read information from the transponders 103a-103n when the UE 111 is within proximity of one or more of the transponders 103a-103n. Communication between the transponder reader 115 and the transponders 103a-103n occur wirelessly. In one embodiment, the transponder reader 115 contains a transmitter, receiver, control unit, and an antenna (not shown). The transponder reader 115 traditionally performs three primary functions: energizing the transponder 103, demodulating the signal from the transponder 103, and decoding the demodulated signal. For example, the transponder reader 115 emits a low-power radio wave field that is used to power the transponder 103 so as to return a signal containing information that is stored in the transponder 103.

The UE 111 is any type of fixed terminal, mobile terminal, or portable terminal including desktop computers, laptop computers, handsets, stations, units, devices, multimedia tablets, Internet nodes, communicators, Personal Digital Assistants (PDAs), electronic books, or any combination thereof. It is also contemplated that the UE 111 can support any type of interface to the user (such as "wearable" circuitry, etc.). The local application 117 may, for instance, perform the actions or provide the services (e.g., initiating payment, searching for information, transferring content) corresponding to the information read from the transponder 103. In addition or alternatively, the actions or services may be performed or provided by one or more applications running on the display host 105 or the services platform 107. For example, these applications may include web browsers, electronic book readers, and the like.

In one embodiment, the UE 111 interacts with various services using the transponder reader 115 to detect a signal from a transponder 103. The signal triggers, for instance, the UE 111, the display host 105, the services platform 107, or a combination thereof to perform one or more actions corresponding to the transponder 103 from which the signal was detected. Because various embodiments enable the dynamic updating of content and actions associated with the transponder 103 and its respective area of the display 101, the system 100 enables the user to intuitively and conveniently interact with a variety of services that are dynamically updated based at least in part on the content presented on the display 101. Hence, the user can point or touch the UE 111 to areas of the display 101 to automatically trigger a desired action or actions.

By way of example, the UE 111 communicates with the other components of the communication network 109 (e.g., transponders 103a-103n, display host 105, services platform 107) using well known, new or still developing protocols. In this context, a protocol includes a set of rules defining how the network nodes within the communication network 103 (e.g., UE 111 and display host 105) interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical layer 1) header, a data-link (layer 2) header, an internetwork (layer 3) header and a transport (layer 4) header, and various application headers (layer 5, layer 6 and layer 7) as defined by the OSI Reference Model.

The following describe several use case scenarios for providing user interaction with services using the transponders 103a-103n disposed on the display 101. In a first use case scenario, the system 100 is used to support one-touch online purchasing. In this example, the user browses an online commerce site and makes purchases by touching the UE 111 to a specific location on the transponder-enabled display 101 where the item is displayed. As the user browses from one page of items to the next, the mapping of the displayed item to the corresponding transponder 103 is dynamically updated. For example, as a user scrolls through a web page of items, the closest transponder 103 in the display 101 is mapped to each item. It is also assumed that the user's billing information has already been stored in the UE 111. On touching the item, the user's billing information is automatically transmitted from the UE 111 to, for instance, the display host 105 or other computer system with connection to the online commerce site to complete the purchase and make payment. Alternatively, the UE 111 can automatically and directly connect to the online commerce site to complete the purchase and make payment. In either case, the system 100 enables the user to complete the purchase by simply touching the item on the display 101.

In a second use case scenario, the system 100 is used to authenticate user access to a secure website. In this example, the user accesses a secure website (e.g., a online banking website, an online voting website, etc.). The website then provides an area on the display 101 for the user the touch the UE 111 to authenticate the user and access the site. It is assumed that the UE 111 already contains the authentication information necessary to the user's access to the secure website. It is also contemplated that the system 100 can use any authentication system (e.g., password, device identification filtering, shared secret, etc.) to ensure that only an authorized user can access the secure website. On touching the authentication area of the display 101, the UE 111 automatically transmits the user's authentication information to the secure website to gain access. For added security, it is contemplated that the secure website can request the user to touch the UE 111 to the screen in a predetermined pattern. For example, if the display 101 includes an array of 3 by 3 transponders integrated into the display, touching the UE 111 on the display with a certain pattern or order known only to the user can authenticate the user. The 3 by 3 array can also represent a numerical keypad from 1 to 9, and the user touches the UE 111 on the display according to a predetermined numerical pass code. In addition to the convenience of automated password entry, this process can also prevent any attempts to track the user's keyboard strokes to gain the user's password.

In a third use case scenario, the system 100 is used to join or register with forums, groups, news feeds, social networking sites, and the like without the need to constantly fill out registration information. In this example, the user can touch the forum, group, news feed, or social network site with the UE 111 to join the respective group. On touching the desired group, the UE 111 automatically transmits the user's registration information to complete the process of joining the group.

In a fourth use case scenario, the system 100 is used to transfer files between the UE 111 and computer connected to the display 101 (e.g., the display host 105). In this example, the files and other content available for transfer are presented on the display 101. The user touches the UE 111 to the file or content that is to be transferred from the computer to the UE 111. On touching the file or content, the UE 111 automatically initiates a communication link with the computer using, for instance, wireless technology such as short range radio (e.g., Bluetooth®), wireless local area network (WLAN), wireless wide area network (WWAN), or any combination thereof, to complete the transfer. To transfer content from the UE 111 to the computer, the user can touch the UE 111 to a specific directory on the computer to automatically initiate the communication link and complete the transfer.

In a fifth use case scenario, the system 100 is used to place a food order at a restaurant. In this example, the user browses a menu presented on the display 101. The user then touches the UE 111 to the desired menu items. On touching the items, the UE 111 automatically transmits billing information to pay for the selected items. In addition, the selected menu items are automatically transmitted to the kitchen for preparation and delivery to the user.

In a sixth use case scenario, the system 100 is used to obtain additional information from an advertisement. In this example, the advertisement can be displayed on a billboard that includes a mechanically rotating or scrolling series of advertisements. As the desired advertisement scrolls around, the user touches the UE 111 to the advertisement to obtain more information about the advertised product. For example, the display host 105 connected to the display 101 automatically creates a communication link (e.g., Bluetooth®, WLAN, or WWAN) with the UE 111 and transfers the more information about the product to the UE 111.

In a seventh use case scenario, the system 100 is used to purchase an item based on a television advertisement. In this example, the user is watching a television on the display 101 and sees a commercial for a desired product. The user touches the UE 111 to the product on the display 101. On touching the display 101, the UE 111 automatically transmits an order to an online merchant for the product and makes payment.

In an eighth use case scenario, the system 100 is used to get more information about a particular clip or scene of a movie or video clip. In this example, a user is watching a movie or video clip on the display 101 and sees a scene of interest. The user touches the UE 111 to the display 101 corresponding to the scene. The UE 111 then automatically receives or searches for information related to the scene.

In a ninth use case scenario, the system 100 is used as mechanism to interact with a game. In this example, the game commands linked to the user via the UE 111 can be initiated touching specific areas of the display 101 presenting the game. For instance, the game may query the UE 111 for specific information to initiate a game option.

Figure 2:
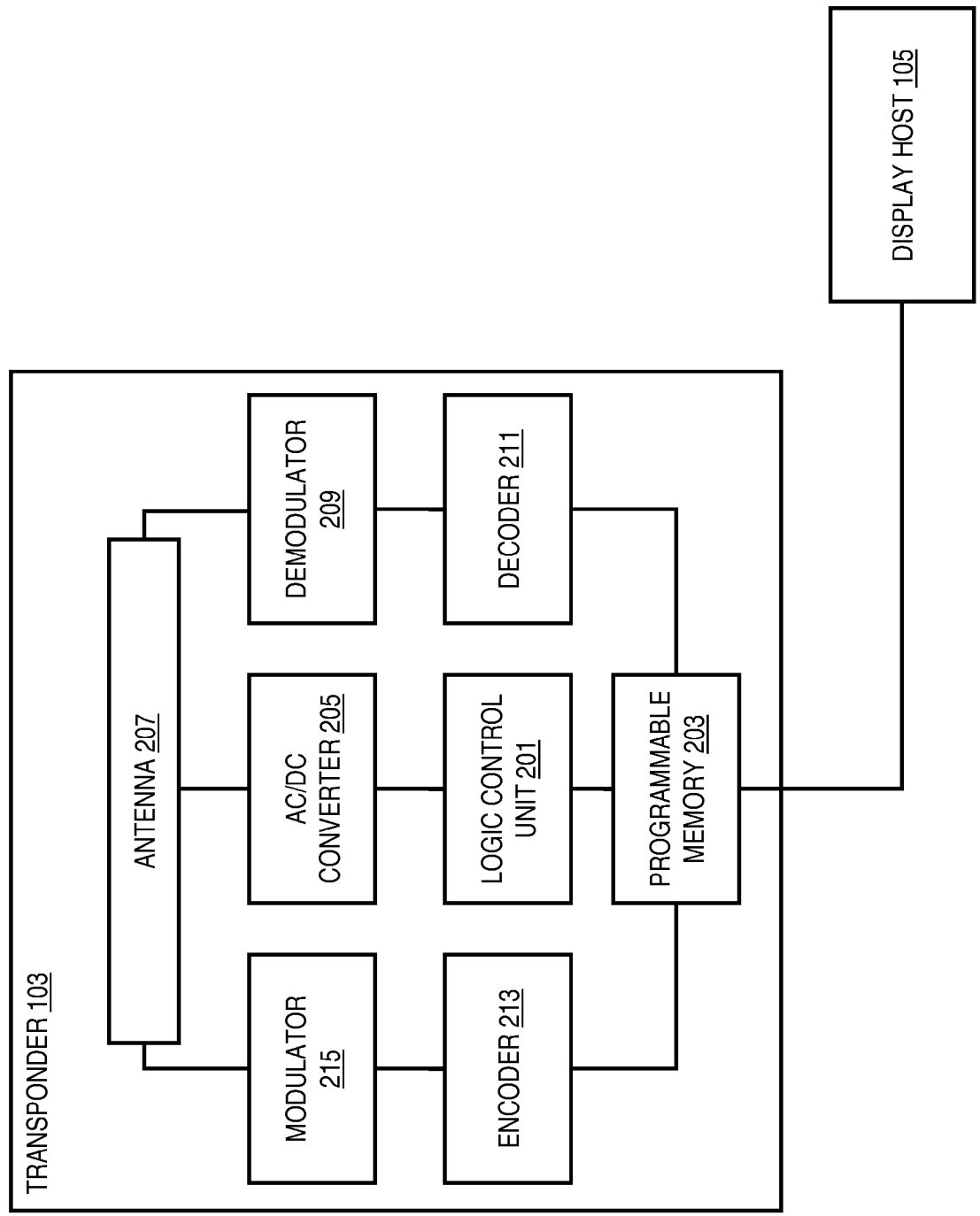
FIG. 2 is a diagram of the components of a transponder, according to one embodiment.

FIG. 2 is a diagram of the components of a transponder, according to one embodiment. As described with respect to FIG. 1, the system 100 includes one or more transponders 103a-103n, each corresponding to a specific area of the display 101. Typically, the transponder 103 (e.g., an RFID tag) is a small microchip that is attached to an antenna. The transponders 103a-103n come, for instance, in a wide variety of sizes, shapes, and forms and can be read through most materials with the exception of conductive materials like water and metal.

Generally, there are two types of transponders 103a-103n, passive transponders 103a-103n and active transponders 103a-103n. Passive transponders 103a-103n are generally smaller, lighter, and less expensive than active transponders 103a-103n and can be applied to objects in harsh environments. They are also maintenance free and can last for years. Passive transponders 103a-103n are only activated when within the response range of a transponder reader 115. As discussed with respect to FIG. 1, the transponder reader 115 emits a low-power radio wave field that is used to power the passive transponder 103 so as to pass on any information that is contained in the transponder 103. Moreover, the information in passive transponders 103a-103n is static and generally includes, for instance, information for specifying a static identification code. Because information in the passive transponder 103 is static and not programmable, the display host 105 or other attached computer may dynamically associate the static identification code with an action related to the content displayed in the area of the display 101 and corresponding transponder 103 from which the static identification code is read.

Active tags differ in that they incorporate their own power source to transmit rather than reflect radio frequency signals. Accordingly, active tags enable a broader range of functionality like programmable and read/write capabilities. FIG. 2 depicts the components of an active transponder 103. It is contemplated that the functions of these components may be combined in one or more components of performed by other components of equivalent functionality. As shown, an active transponder 103 includes a logic control unit 201 to control the functions of the transmitter (e.g., receive a query from the transponder reader 115 and transmit a signal in response to the query). The logic control unit 201 has connectivity to a programmable memory 203 for storing information that is to be transmitted to the transponder reader 115. In one embodiment, the programmable memory 203 is an electrically erasable programmable read-only memory (EEPROM). For example, the active transponder 103 can be dynamically programmed based at least in part on the content displayed in the area of the display 101 to which the active transponder 103 corresponds. The programmed information includes, for instance, service-related information or other information to specify one or more actions corresponding to the respective area of the display 101. By way of example, the service-related information or other information may specify the service, product, item, parameters, web address, etc. for performing the corresponding action. In addition or alternatively, the information may include a dynamic identification code associated with a particular action or actions. In one embodiment, the display host 105 has connectivity to the transponder 103 for dynamically programming the programmable memory 203. The information can then be provided as a signal to trigger a specific action when the transponder 103 is read. The logic control unit 201 also has connectivity to an AC/DC converter 205 to in part provide electrical power to erase and reprogram the programmable memory 203.

The active transponder 103 includes an antenna 207 for transmitting and receiving radio signals. When receiving a signal (e.g., a query from the transponder reader 115), the antenna 207 passes the received radio signal to a demodulator 209 to extract information from the radio signal (e.g., carrier wave). The information is then forwarded to a decoder 211 to decode the information for processing by the logic control unit 201. To transmit information, the logic control unit 201 retrieves the information from the programmable memory 203 and forwards it to an encoder 213. The encoder 213 then passes the encoded information to a modulator 215 for convert the information to a radio signal for transmission over the antenna 207.

Figure 3A:
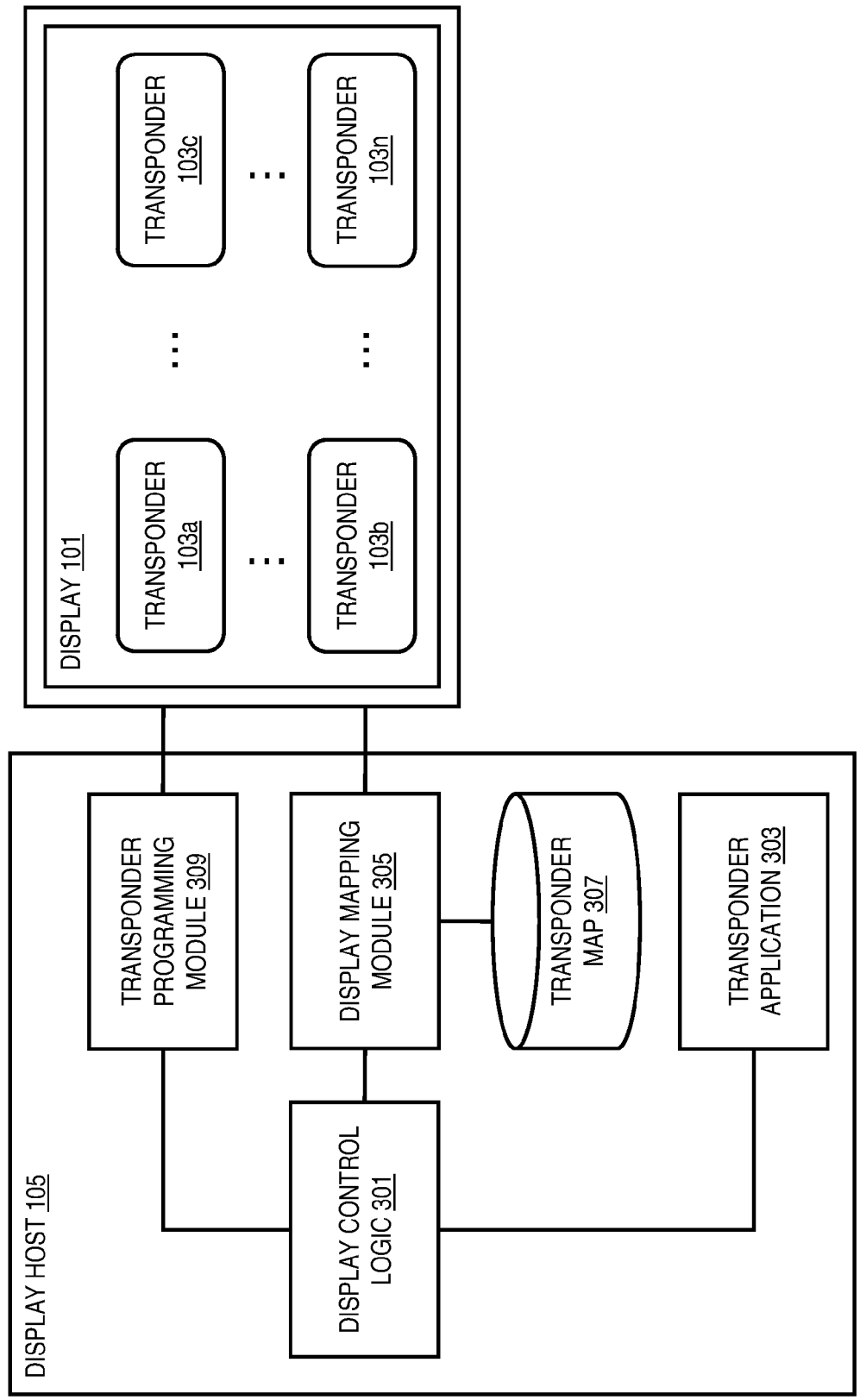
FIGS. 3A-3B are diagrams of the components of a display host and associated process for dynamically programming the display, according to various embodiments.
Figure 3B:
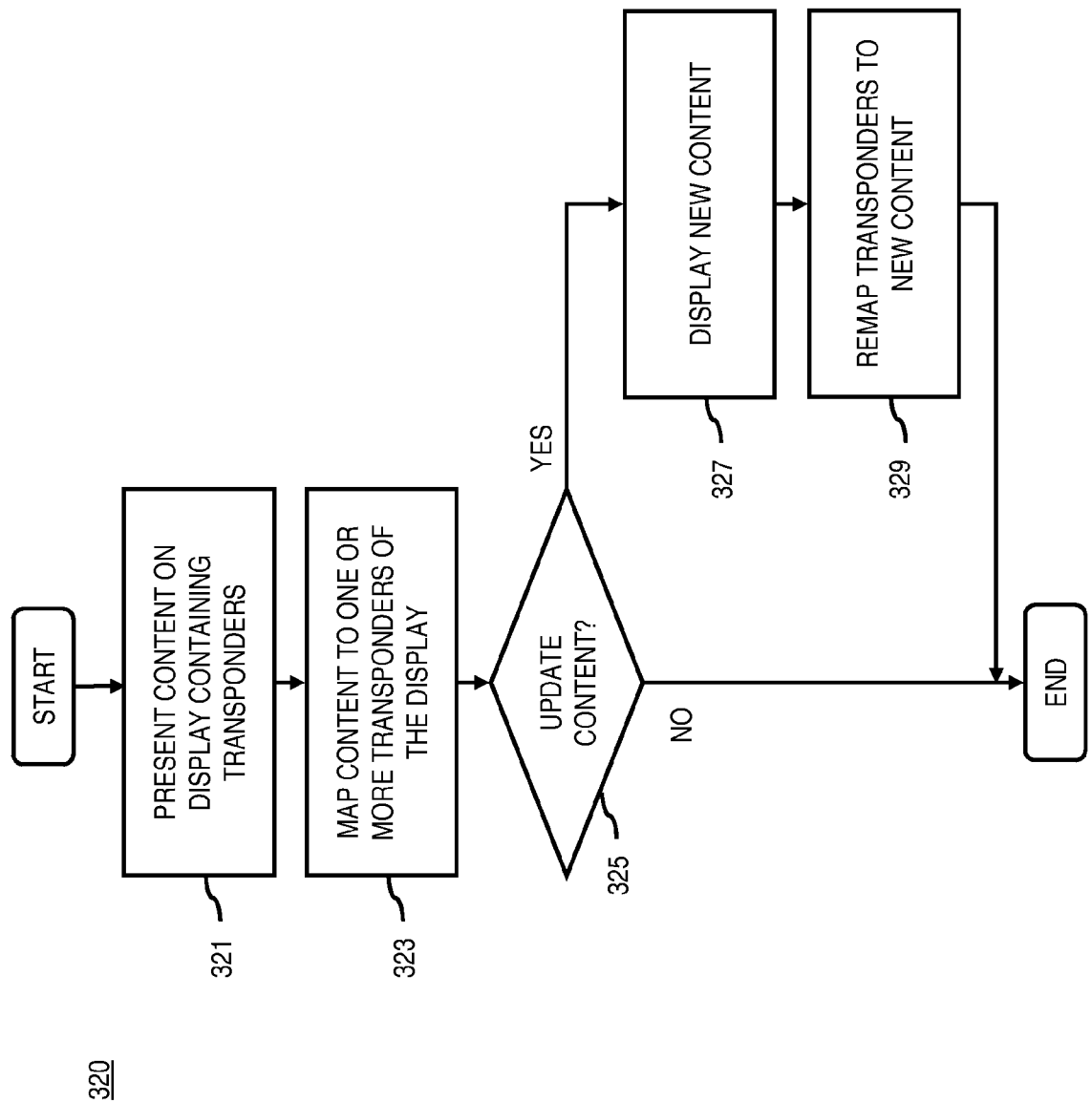

FIGS. 3A-3B are diagrams of the components of a display host and associated process for dynamically programming the display, according to various embodiments. As shown in FIG. 3A, the display host 105 includes one or more components for interacting with the display 101. The display host 105 may also be any computing device (e.g., a computer) capable of presenting content and the display 101 and interfacing with the transponders 103 of the display 101. It is contemplated that the functions of these components may be combined in one or more components or performed by other components of equivalent functionality. In one embodiment, the display host 105 includes a display control logic 301 for coordinating the content presented on the display 101 with the one or more transponders 103a-103n disposed on the display 101. For example, the display control logic 301 has connectivity to a transponder application 303. The transponder application 303 includes any application amenable to control by user interaction with the display 101. In one embodiment, the transponder application 303 provides metadata information corresponding to particular items such as content (e.g., images, text) to be presented on the display 101.

The metadata information may contain information such as content identification and corresponding actions (e.g., automated pairing of Bluetooth® and transfer of files between the UE 111 and the display host 105; or automated purchase and payment).

The display control logic 301 interacts with the display mapping module 305 to, for instance, automatically map the various content items on the display 101 to the nearest transponder 103. In one embodiment, this mapping is stored in a database 307 as a transponder map of the display 101. When the content of the display 101 changes and the transponders 103a-103n are programmable, the display control logic 301 can direct a transponder programming module 309 to reprogram the transponders 103a-103n of the display 101 to match the changed content using the process as described with respect to FIG. 2. Alternatively, if the transponders 103a-103n are passive and not programmable, the display control logic 301 directs the display mapping module 305 to update the transponder map 307 to correlate the static identification code corresponding to each passive transponder 103 with the respective updated content. For example, the display mapping module 305 maps each transponder's static identification code with the content displayed at the respective area of the display 101. The advantages of using passive transponders 103 with static identification codes are (1) overall simplification of the system (e.g., because passive transponders 103 need not be programmed), and (2) lower cost because traditionally passive transponders 103 are much less expensive than active transponders 103. Using active transponders 103 enables the UE 111, display host 105, or computing device to avoid the added burden of deriving the information from a static identification code because the active transponders 103 include additional memory to store service-related information.

FIG. 3B is a flowchart of a process for dynamically programming the display 101, according to one embodiment. By way of example, the display host 105 performs the process 320 to dynamically link the contents of the display 101 with the respective transponders 103 disposed on the display 101. In step 321, the display host 105 displays content on the display 101. The content may be generated, for instance, by a transponder application 303 (e.g., a web browser, presentation software, file transfer application, advertising application, etc.). The display host 105 then maps the content of the display 101 to the transponder 103 corresponding to the area of the display in which the content is displayed (step 323). For example, the display host 105 can either automatically map each item of the displayed content to the closest transponder 103 or configure the application to display content at specific areas of the display to match a particular transponder 103. As part of the mapping process, the display host 105 can also reprogram the each transponder 103 (e.g., if the transponders 103 are active and dynamically programmable) to include information related to the content. If the transponders 103 are passive, the mapping process includes using the application 303 or the other component of the display host 105 to dynamically correlate information related to the content to, for instance, a unique static identification code included within each passive transponder 103. In either case, a UE 111 equipped with a transponder reader can obtain information related to the content by reading a signal from the corresponding transponder 103.

As described previously, the system 100 enables the dynamically changing the content of the display 101. When the content of the display 101 is changed (step 325), the display host 105 displays the new content on the display 101 (step 327). For example, the content change may occur when the application 303 provides new content (e.g., a web browser application scrolls to a new page or new section of an existing page). Concurrent with the change, the display host 105 also initiates a corresponding remapping of the transponders 103 to correlate with the new content (step 329). The remapping process is identical to the mapping process described with respect to step 323. As a result of the update process, each area of the display 101 displays new content. Each respective transponder 103 is also correspondingly updated with new information to trigger one or more actions related to the new content.

Figure 4A:
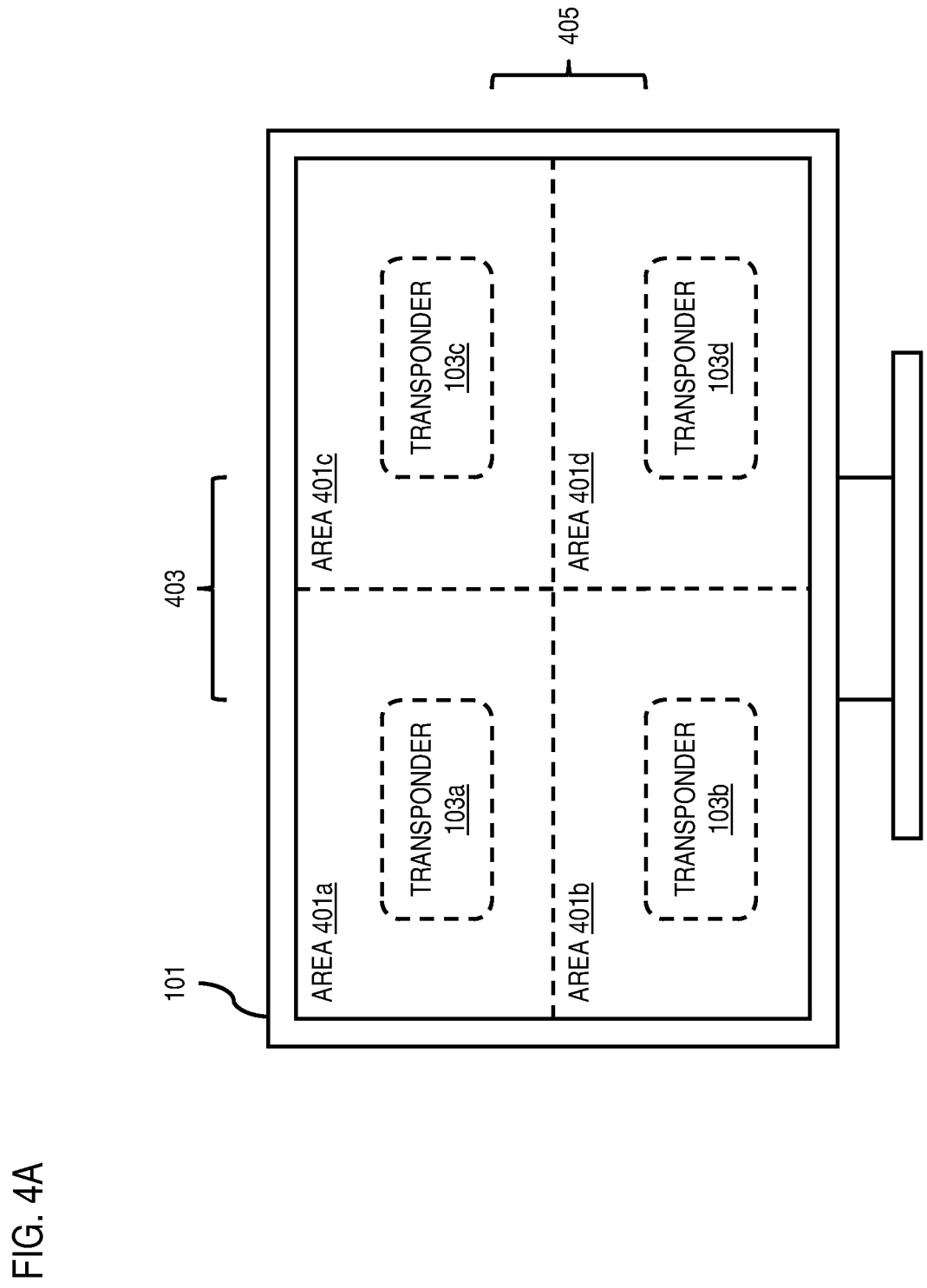
FIGS. 4A-4B are diagrams of depicting a front view and side view, respectively, of a display including transponders, according to various embodiments.
Figure 4B:
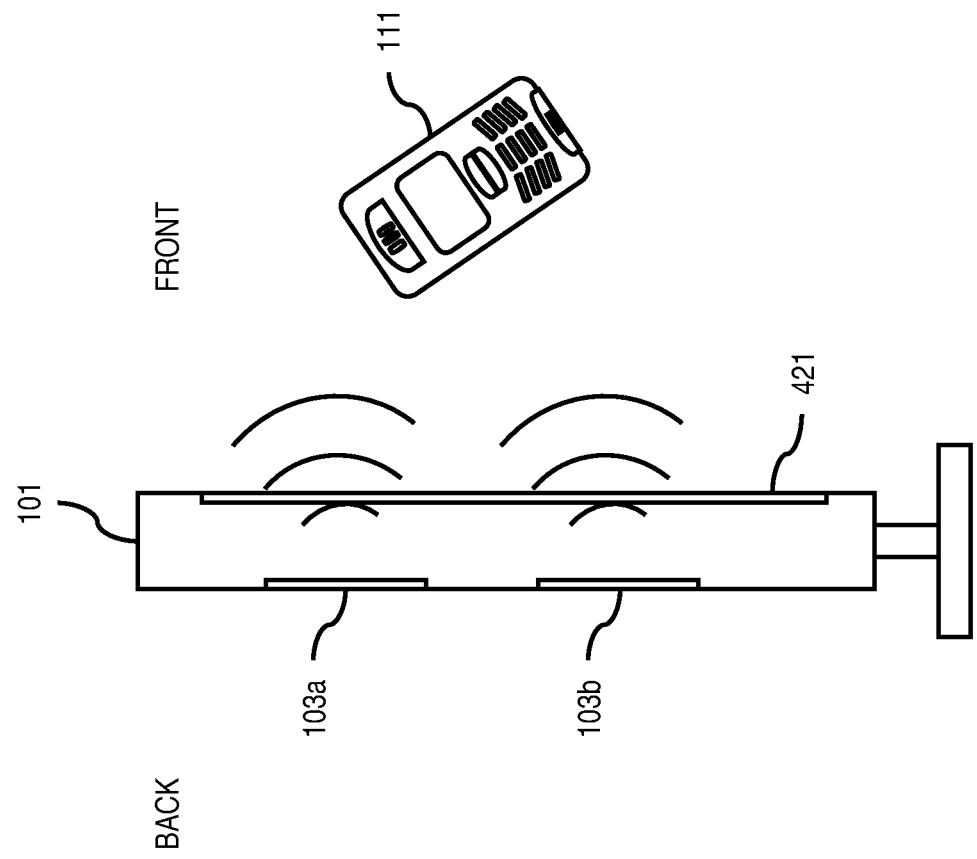

FIGS. 4A-4B are diagrams of depicting a front view and side view, respectively, of a display including transponders, according to various embodiments. As shown in FIG. 4A, the display 101 includes four transponders 103a-103d disposed on the display 101. Each transponder 103a-103d corresponds to a respective area 401a-401d of the display. In other words, each transponder 103a-103d corresponds to the content displayed in the respective area 401a-401d. In various embodiments, the transponders 103a-103d are embedded so that the transponders do not, for instance, obstruct the display 101. In the example of FIGS. 4A and 4B, the transponders 103a-103d are embedded in the back casing of the display 101. If the transponders 103a-103d are small enough, transparent, or do not otherwise obstruct the display 101, the transponders 103a-103d can, for instance, be mounted on the front of the display.

The transponders 103a-103d are also arranged to minimize the potential for false detection or excitation of the transponder 103 due to the close proximity of each tag (e.g., reading a transponder 103 other than the intended transponder 103). The configuration of the transponders 103a-103d is dependent, at least in part, on the size of the transponders 103a-103d and the size of the display 101. By way of example, each transponder 103 (e.g., an RFID tag) measures approximately 60 mm×30 mm. The horizontal spacing 403 and vertical spacing 405 between can be varied to minimize the potential for false detection or excitation of the transponder.

FIG. 4B depicts the display 101 from a side cross-sectional view. As shown, the transponders 103a and 103b are embedded in the back casing of the display. In this example, the transponders 103a-103b are configured to transmit with sufficient power to penetrate through the intervening material of the display (e.g., the LCD screen 421 and intervening electronics. For example, the transmission power can be configured to enable the UE 111 to read the information from the transponders 103a-103b from the front of the display 101. The transmission power can also be configured to reduce the potential for false detection or excitation of neighboring transponders 103a-103b.

Figure 5:
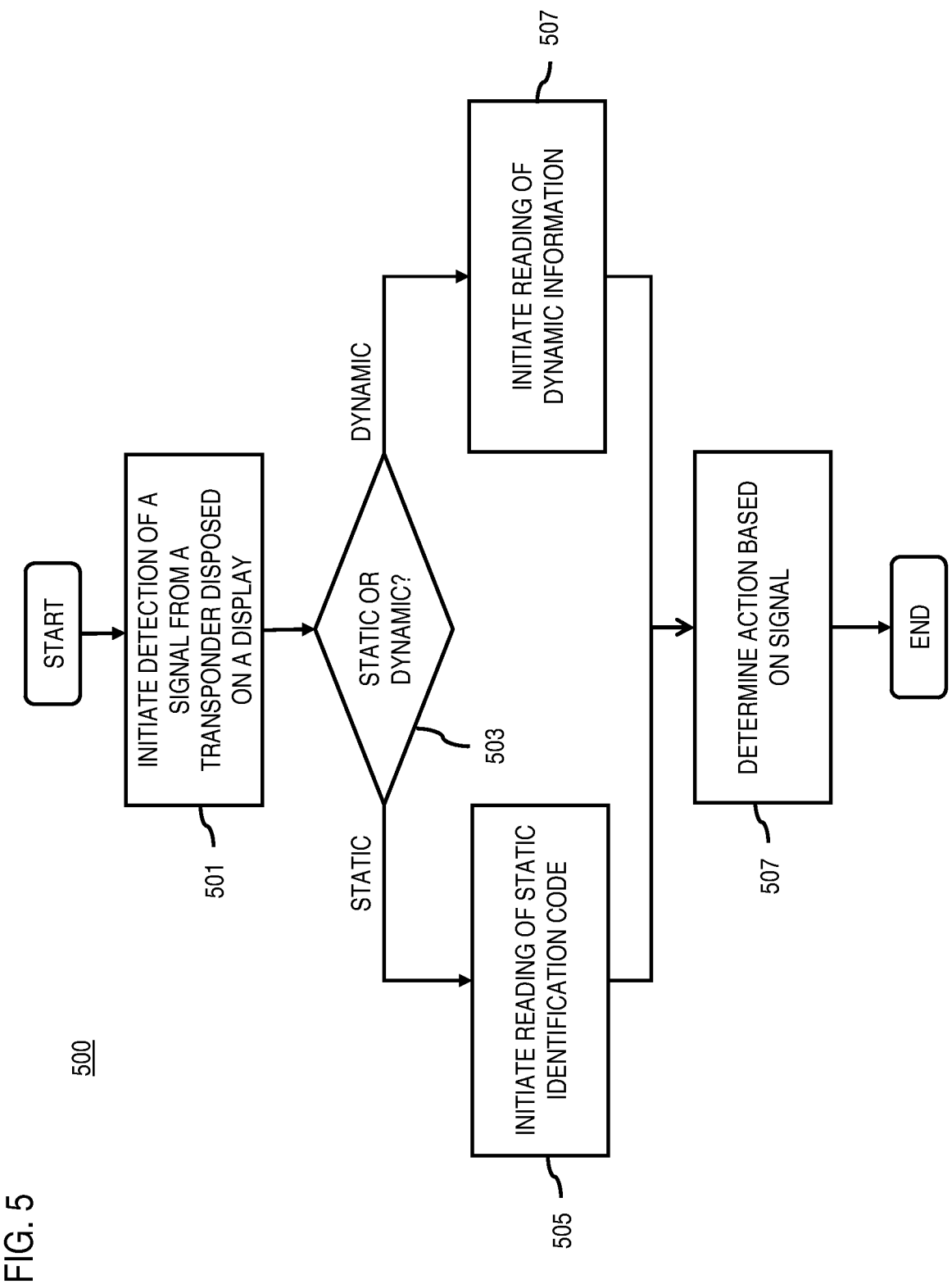
FIG. 5 is a flowchart of a process for providing user interaction via transponders disposed on a display, according to one embodiment.

FIG. 5 is a flowchart of a process for providing user interaction via transponders disposed on a display, according to one embodiment. In one embodiment, the transponder control module 113 performs the process 500 and is implemented in, for instance, a chip set including a processor and a memory as shown FIG. 8. In step 501, the transponder control module 113 initiates detection of a signal from one of a plurality of transponders 103a-103n disposed on a display 101. For example, the detection of the signal can be initiated when the UE 111 is brought within sufficient proximity of one of the transponders 103a-103n to detect the signal. In this example, each of the transponders 103a-103n corresponds to a specific area of the display 101. Accordingly, the UE 111 is brought within proximity of or touches the desired area of the display 101 to initiate detection of the signal.

On detection of the signal, the transponder control module 113 determines whether the transponder 103 is providing static or dynamic information in the signal (e.g., determining whether the transponder 103 is passive or active) (step 503). If the transponder 103 is providing static information, the transponder control module 113 initiates reading of the static information (e.g., a static identification code) using the process as described with respect to FIG. 2 (step 505). In various embodiments, the static identification code is unique to the respective transponder 103 and cannot be changed. Accordingly, an application (e.g., transponder application 303 within the display host 105 or the local application 117 within the UE 111) can be used to dynamically associate or trigger one or more actions corresponding to the static identification code. For example, when a content file is displayed in the area associated with a particular transponder 103, the static identification code that is read from the transponder 103 to trigger the transfer of the file to the UE 111. When an item available for purchase is displayed in the same area, the same static identification code can trigger one or more actions to purchase the item.

If the transponder 103 is providing dynamic information (e.g., the transponder 103 is dynamically programmable to provide information related to the content displayed in the area of the display 101 associated with the transponder 103), the transponder control module 113 initiates reading of the dynamic information from the transponder 103 (step 507). Active transponders have more on-board memory and can provide information that is much more descriptive that just a static identification code. The dynamic information, for instance, includes information that can be used to trigger an action related to the content displayed in the respective area of the display 101. More specifically, as described with respect to FIG. 2, the dynamic information may specify the service, product, item, parameters, etc. for performing the corresponding action. In addition or alternatively, the information may include a dynamic identification code associated with a particular action or actions. In this case, the active transponder 103 can act like a passive transponder 103.

After reading the information (e.g., the static or dynamic information), the transponder control module 113 determines an action in response to the signal (step 509). The process for determining the action is described above according to whether the information is static or dynamic. The action, for instance, is related to the content displayed in the area of the display 101 corresponding to the transponder 103 from which the signal was detected. In various embodiments, the action includes initiating communication with a user device in proximity to the respective area of the display 101. By way of example, this communication can be through short range radio (e.g., NFC, Bluetooth®), WLAN, WWAN, or a combination thereof. The established communication can then be used to support additional determined actions including initiating a purchase, initiating a payment, initiating an order, initiating a transfer of content, initiating management of a membership or subscription, initiating a request for information, initiating interaction with a game, or a combination thereof. For example, to initiate transfer of a file between the UE 111 and the display host 105, the transponder control module 113 can direct the local application 117 within the UE 111 and/or the transponder application 303 within the display host 105 to automatically establish a Bluetooth® link and initiate a file transfer over the link.

Figure 6A:
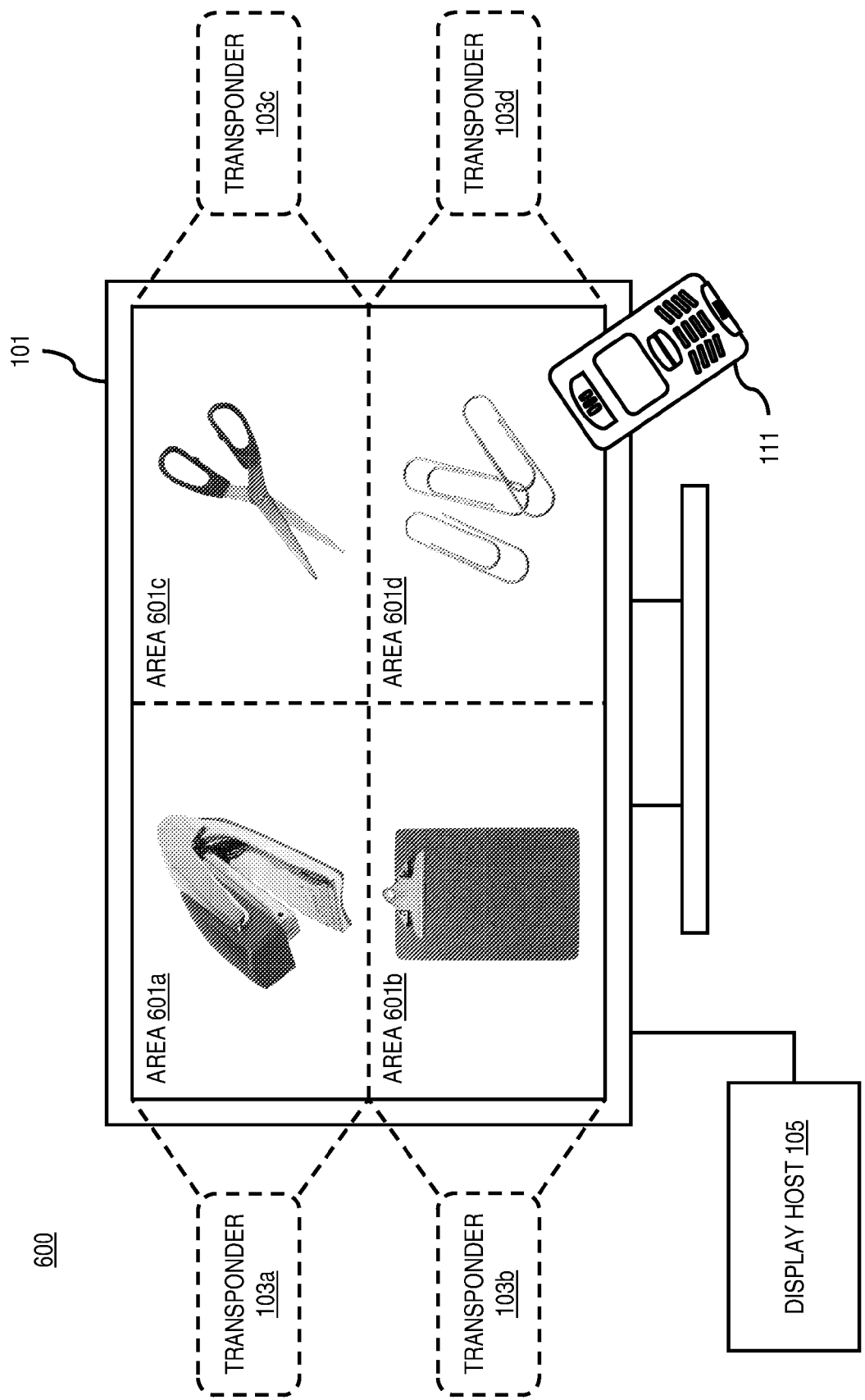
Figure 6C:
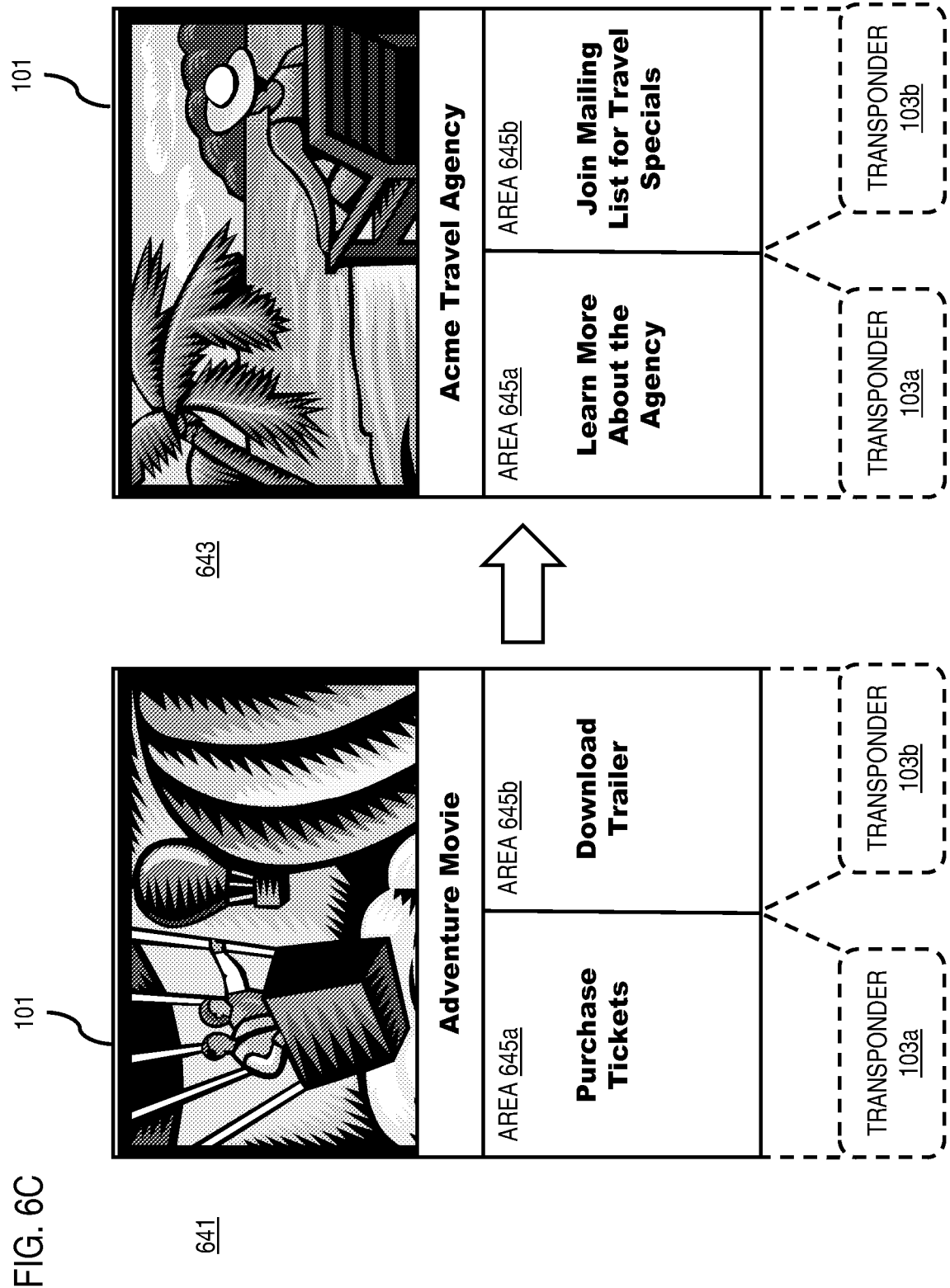

FIGS. 6A-6C are diagrams of user interfaces utilized in the process of FIG. 5, according to various embodiments. FIG. 6A depicts a user interface 600 for interacting with an online commerce site (e.g., an online office supply store). In this example, the display 101 includes four transponders 103a-103d corresponding to four respective areas 601a-601d of the display 101. Each area 601a-601d displays one item available for purchase through the online site. As the user browses from one page of the online catalog to the next, the item displayed in each area 601a-601d is dynamically updated. As shown in FIG. 6A, area 601a displays a stapler, area 601b displays a clipboard, area 601c displays a pair of scissors, and area 601d displays paperclips. To purchase an item, the user touches the UE 111 to a respective area 601a-601n. In this case, the user touches the UE 111 to area 601d to purchase paper clips. On touching the area 601d, the UE 111 transfers the user's billing and payment information (e.g., via Bluetooth®) to the display host 105 to complete the purchase. Alternatively, the UE 111 receives the item information from either the transponder 601d or the display host 105 and automatically completes the purchase by directly connecting to the online office supply store using the communication capabilities of the UE 111.

FIG. 6B depicts a user interface 620 for completing the purchase discussed with respect to FIG. 6A. To confirm purchase of the paper clips, the display 101 is dynamically updated to show a purchase confirmation message. As updated, the areas 601a-601d no longer depict or correspond to the items available for purchase. Instead, the areas 601a and 601c display a confirmation message that the order and payment information have been received and presents the user an option to confirm the purchase in area 601b or to cancel the order in area 601d. In the example of FIG. 6A, the user touches the UE 111 to the area 601b to confirm the purchase. As an added security measure, the billing and payment information in the UE 111 can be verified as part to the confirmation process. The verification action, for instance, includes automatically retransmitting the billing and payment information from the UE 111 to the display host 105 to compare against the previously received information.

FIG. 6C depicts user interfaces 641 and 643 for interacting with a non-electronic display. As shown, the display 101 is billboard whose content can change using, for instance, a mechanical scrolling system. User interface 641 presents a movie poster (e.g., for "Adventure Movie") including two areas 645a and 645b that have embedded transponders 103a and 103b respectively. For example, the user can touch the UE 111 to area 645a to purchase tickets to the movie or to area 645b to download a trailer of the movie to the UE 111. After a predetermined time interval, the display 101 rotates to display an advertisement for a travel agency (e.g., Acme Travel Agency) as depicted in user interface 643. Accordingly, the mapping of the content to the embedded transponders 103a and 103b are also updated. After the change, the area 645a now corresponds to learning more about the advertised travel agency, and the area 645b now corresponds to joining a mailing list to receive travel specials from the travel agency.

The processes described herein for providing user interaction via transponders disposed on a display may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
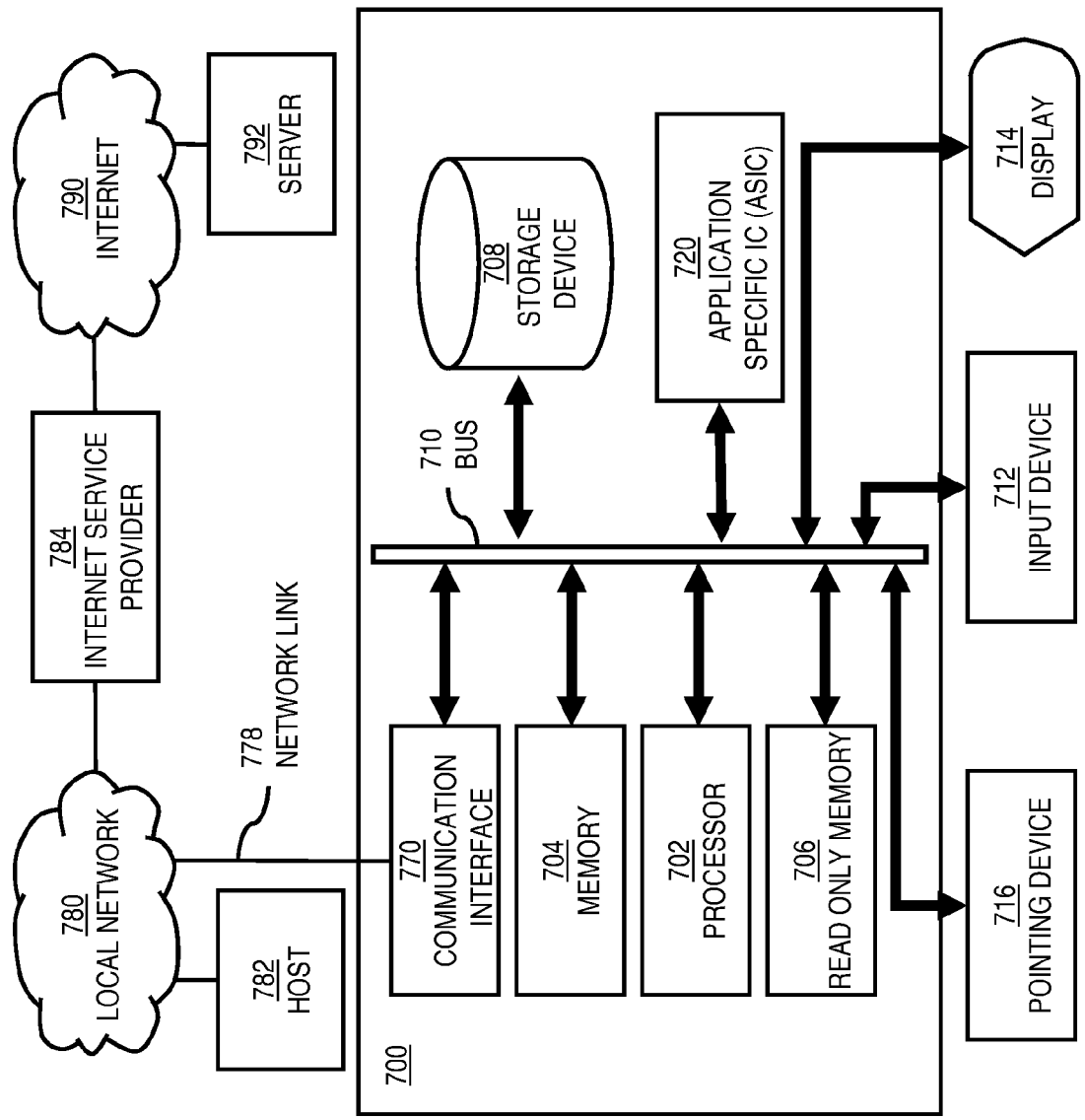
FIG. 7 is a diagram of hardware that can be used to implement an embodiment of the invention.

FIG. 7 illustrates a computer system 700 upon which an embodiment of the invention may be implemented. Computer system 700 is programmed to provide user interaction via transponders disposed on a display as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information related to providing user interaction via transponders disposed on a display. The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing user interaction via transponders disposed on a display. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing user interaction via transponders disposed on a display, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 109 for providing user interaction via transponders disposed on a display with services of the display host 105 and/or the services platform 107.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 8:
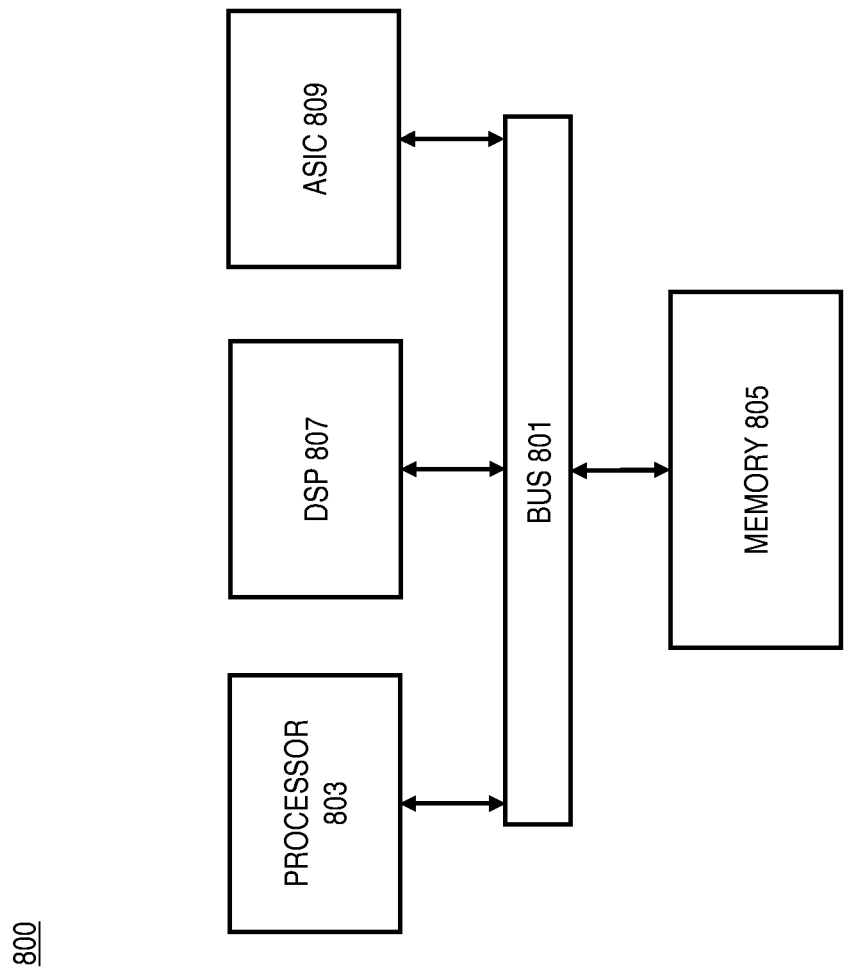
FIG. 8 is a diagram of a chip set that can be used to implement an embodiment of the invention.

FIG. 8 illustrates a chip set 800 upon which an embodiment of the invention may be implemented. Chip set 800 is programmed to provide user interaction via transponders disposed on a display as described herein and includes, for instance, the processor and memory components described with respect to FIG. 7 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide user interaction via transponders disposed on a display. The memory 805 also stores the data associated with or generated by the execution of the inventive steps.

Figure 9:
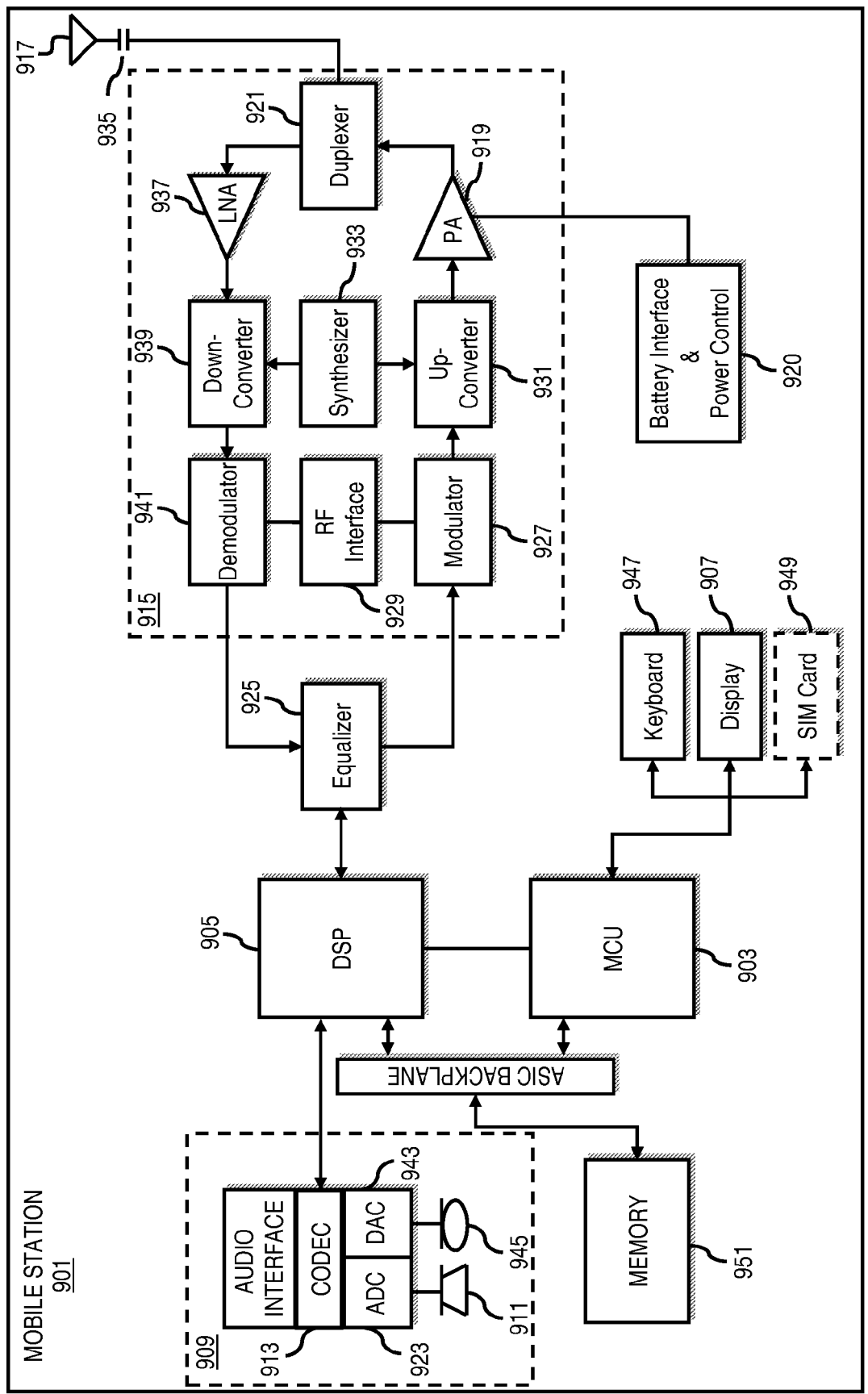
FIG. 9 is a diagram of a mobile station (e.g., handset) that can be used to implement an embodiment of the invention.

FIG. 9 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer user interaction via transponders disposed on a display. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software facilitate user control of at least some functions of the mobile station 901 via transponders disposed on a display. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    causing, at least in part, detection at an apparatus of a signal from at least one of a plurality of transponders disposed on a dynamically reconfigurable display, wherein the apparatus is physically separated from the display, and each of the transponders physically corresponds to an area of the display;
    determining by the apparatus an action in response to the signal, wherein the action is related to content displayed in the respective area of the display; and
    causing, at least in part, transmission from the apparatus to a secured website of authentication information for use of the transponders and the secured website in response to the action determination; and
    designating a plurality of areas of the display corresponding to the transponders as an array;
    wherein the transmission of the authentication information to the secured website is triggered when the apparatus approaches the array within a predetermined distance in a predetermined pattern, order, or a combination thereof, that includes some or more of the areas of the array,
    wherein the authentication information is based, at least in part, on a service associated with the action and the secured website, and
    wherein the apparatus is a user terminal that includes a transponder reader.

2. The method of claim 1, wherein the apparatus is a mobile user terminal, the display is embedded in another mobile user terminal,
    the transponders are near field communication (NFC) tags, radio frequency identification (RFID) tags, contactless cards, or a combination thereof, and
    the transponders either contain static content or are dynamically programmable.

3. The method of claim 2, wherein the mobile user terminals are mobile phones, and the signal comprises a static identification code corresponding to the action.

4. The method of claim 1, wherein the transponders are programmable to comprise information to trigger the action in the signal.

5. The method of claim 1, wherein the action comprises initiating a purchase, initiating a payment, initiating an order, initiating a transfer of content, initiating management of a membership or subscription, initiating a request for information, initiating interaction with a game, or a combination thereof.

6. The method of claim 1, wherein the action comprises establishing a communication link using wireless technology comprising short range radio, wireless local area network (WLAN), wireless wide area network (WWAN), or a combination thereof.

7. An apparatus comprising:
    at least one processor; and
    at least one memory including computer program code,
        the at least one memory and the computer program code configured to, with the at least one processor, cause the apparatus to perform at least the following,
        cause, at least in part, detection of a signal from at least one of a plurality of transponders disposed on a dynamically reconfigurable display, wherein the apparatus is separated from the display, and each of the transponders corresponds to an area of the display,
        determine an action in response to the signal, wherein the action is related to content displayed in the respective area of the display,
        cause, at least in part, transmission to a secured website of authentication information for use of the transponders and the secured website in response to the action determination; and
        designate a plurality of areas of the display corresponding to the transponders as an array,
        wherein the transmission of the authentication information to the secured website is triggered when the apparatus approaches the array within a predetermined distance in a predetermined pattern, order, or a combination thereof, that includes some or more of the areas of the array,
wherein the authentication information is based, at least in part, on a service associated with the action and the secured website, and
wherein the apparatus is a user terminal that includes a transponder reader.

8. The apparatus of claim 7, wherein the apparatus is a mobile user terminal, the display is embedded in another mobile user terminal, and the transponders are near field communication (NFC) tags, radio frequency identification (RFID) tags, contactless cards, or a combination thereof.

9. The apparatus of claim 8, wherein the mobile user terminals are mobile phones, and the signal comprises a static identification code corresponding to the action.

10. The apparatus of claim 7, wherein the transponders are programmable to comprise information to trigger the action in the signal.

11. The apparatus of claim 7, wherein the action comprises initiating a purchase, initiating a payment, initiating an order, initiating a transfer of content, initiating management of a membership or subscription, initiating a request for information, initiating interaction with a game, or a combination thereof.

12. The apparatus of claim 7, wherein the action comprises establishing a communication link using wireless technology comprising short range radio, wireless local area network (WLAN), wireless wide area network (WWAN), or a combination thereof.

13. A non-transitory computer-readable storage medium carrying one or more sequences of one or more instructions which, when executed by one or more processors, cause an apparatus to perform at least the following:
causing, at least in part, detection of a signal from at least one of a plurality of transponders disposed on a dynamically reconfigurable display, wherein the apparatus is separated from the display, and each of the transponders corresponds to an area of the display;
determining an action in response to the signal, wherein the action is related to content displayed in the respective area of the display;
causing, at least in part, transmission to a secured website of authentication information for use of the transponders and the secured website in response to the action determination; and
designating a plurality of areas of the display corresponding to the transponders as an array,
wherein the transmission of the authentication information to the secured website is triggered when the apparatus approaches the array within a predetermined distance in a predetermined pattern, order, or a combination thereof, that includes some or more of the areas of the array,
wherein the authentication information is based, at least in part, on a service associated with the action and the secured website, and
wherein the apparatus is a user terminal that includes a transponder reader.

14. The non-transitory computer-readable storage medium of claim 13, wherein the apparatus is a mobile user terminal, the display is embedded in another mobile user terminal, and the transponders are near field communication (NFC) tags, radio frequency identification (RFID) tags, contactless cards, or a combination thereof.

15. An apparatus comprising:
a dynamically reconfigurable display; and
a plurality of transponders disposed on the display,
wherein each of the transponders corresponds to an area of the display,
wherein at least one of the plurality of transponders causes, at least in part, transmission of a signal to be detected by a transponder reader of a mobile user terminal in the proximity of the display,
wherein an action is determined by the mobile user terminal in response to the signal, and the action is related to content displayed in the respective area of the display,
wherein authentication information is received at a secured website from the mobile user terminal in response to the action determination for use of the transponders and the secured website, and the authentication information is based, at least in part, on a service associated with the action and the secured website,
wherein a plurality of areas of the display corresponding to the transponders are designated as an array, and
wherein the transmission of the authentication information to the secured website is triggered when the apparatus approaches the array within a predetermined distance in a predetermined pattern, order, or a combination thereof, that includes some or more of the areas of the array.

16. The apparatus of claim 15, wherein the apparatus is another mobile user terminal, and the apparatus further comprises:
the plurality of transponders further configured to not obstruct the display, to radiate with enough power to penetrate through the display, and to minimize false detection or excitation.

17. The apparatus of claim 15, wherein the mobile user terminal is a mobile phone, and the transponders are dynamically programmable, further comprising:
a processor configured to program each of the transponders to transmit information related to content displayed in the area corresponding to each transponder.

18. The apparatus of claim 15, wherein the display is an electronic video display comprising a monitor, television, electronic book, multimedia tablet, or a personal digital assistant; or a reconfigurable non-electronic display comprising a reconfigurable poster, billboard, menu, pamphlet, or brochure.

* * * * *